US011227131B2

(12) United States Patent
Frederick et al.

(10) Patent No.: US 11,227,131 B2
(45) Date of Patent: Jan. 18, 2022

(54) RFID ANTENNA MULTIPLEXERS

(71) Applicant: Clairvoyant Technology, Inc., Durham, NC (US)

(72) Inventors: Thomas J. Frederick, Chapel Hill, NC (US); Scott McMillan, Apex, NC (US)

(73) Assignee: Clairvoyant Technology, Inc., Chapel Hill, NC (US)

( * ) Notice: Subject to any disclaimer, the term of this patent is extended or adjusted under 35 U.S.C. 154(b) by 0 days.

(21) Appl. No.: 17/375,840

(22) Filed: Jul. 14, 2021

(65) Prior Publication Data

US 2021/0342559 A1 Nov. 4, 2021

Related U.S. Application Data

(63) Continuation of application No. PCT/US2020/013798, filed on Jan. 16, 2020.

(60) Provisional application No. 62/793,662, filed on Jan. 17, 2019.

(51) Int. Cl.
*G06K 7/10* (2006.01)
*G06K 7/00* (2006.01)
*H04B 5/00* (2006.01)

(52) U.S. Cl.
CPC ....... *G06K 7/10356* (2013.01); *G06K 7/0008* (2013.01); *H04B 5/0087* (2013.01)

(58) Field of Classification Search
CPC ............ G06K 7/10356; G06K 7/0008; H04B 5/0087
USPC ...................................................... 340/10.34
See application file for complete search history.

(56) References Cited

U.S. PATENT DOCUMENTS

| 8,446,256 | B2* | 5/2013 | Pinkham | G06K 7/10356 340/10.3 |
| 8,941,471 | B2 | 1/2015 | Shafer | |
| 2002/0196146 | A1* | 12/2002 | Moore | G06K 17/00 340/572.7 |
| 2009/0009296 | A1* | 1/2009 | Shafer | G06K 7/0008 340/10.1 |
| 2009/0102610 | A1* | 4/2009 | Lance | G06K 7/10346 340/10.2 |

(Continued)

OTHER PUBLICATIONS

Application No. PCT/US2020/013798, International Search Report and Written Opinion, dated Apr. 14, 2020, 15 pages.

(Continued)

*Primary Examiner* — Kerri L McNally
(74) *Attorney, Agent, or Firm* — Kilpatrick Townsend & Stockton LLP

(57) ABSTRACT

Aspects and features of this disclosure include a radio frequency identification (RFID) antenna multiplexer. An RFID reader and an RFID system using the RFID antenna multiplexer are also disclosed. The multiplexer includes multiple output ports. Each of at least some of the output ports is connectable to an antenna or another device. In some aspects, a logic circuit in the multiplexer is configured to cause a radio frequency (RF) switch to select an output port from the multiple output ports to connect to the input port based upon a reduction in RF power at the input port. In some aspects, the multiplexer includes an energy harvester connected to the input port to harvest signal energy from the RFID reader and a storage device connected to the energy harvester to store the signal energy and supply power to the multiplexer using the signal energy.

24 Claims, 10 Drawing Sheets

(56) References Cited

U.S. PATENT DOCUMENTS

| | | | | |
|---|---|---|---|---|
| 2014/0049379 A1* | 2/2014 | Pinkham | ............ | G06K 7/10356 |
| | | | | 340/10.5 |
| 2014/0097254 A1* | 4/2014 | Downie | ............. | G06K 19/0704 |
| | | | | 235/492 |
| 2014/0230472 A1 | 8/2014 | Coradetti et al. | | |
| 2015/0048682 A1 | 2/2015 | Murley | | |

OTHER PUBLICATIONS

Texas Instruments , "Ultra Low Power Harvester Power Management IC with Boost Charger, and Nano-Powered Buck Converter", SLUSBH2C—Mar. 2013—Revised Jan. 2014; Texas Instruments Incorporated, Copyright 2013-2014, 41 pages.

* cited by examiner

RFID ANTENNA MULTIPLEXERS

PRIORITY CLAIM

The presented application is a continuation of PCT Application No. PCT/US2020/013798, filed Jan. 16, 2020, which claims the benefit of priority to U.S. Provisional Application No. 62/793,662 filed Jan. 17, 2019, the full disclosure of both are incorporated herein by reference in its entirety for all purposes.

TECHNICAL FIELD

The present disclosure relates generally to radio frequency identification (RFID) systems. More particularly, though not exclusively, the present disclosure relates to systems that include one or more multiplexers that can be used to interface an RFID reader with multiple antennas to improve system coverage.

BACKGROUND

RFID systems include, at least, an RFID reader and an antenna. The antenna is used by the reader to transmit interrogation signals to RFID tags and receive responses from the RFID tags. RFID systems can use multiple antennas connected to a single reader in order to spread the relatively high cost of the RFID reader electronics over a relatively large servicing area. Multiple antennas can be connected to a single RFID reader using an RFID antenna multiplexer (mux). Multiple muxes can be connected to a single RFID reader in various topologies.

In addition to a coaxial cable or other radio frequency (RF) connection between the reader and a mux, a data cable is also connected between the reader and a mux. As an example of a data cable, some systems use an Ethernet cable to pass control information between the reader and any muxes. A power supply cable can also be used. The power supply cable and a data cable can sometimes be combined, or power can be supplied over the RF coaxial cable. Alternatively, for example, in retail environments where AC power is distributed throughout a premises, power can be supplied to a mux locally. Power is needed for the electronics of the muxes and the data cables provide signaling so that the RFID reader can direct switching between or among antennas at appropriate times.

SUMMARY

Aspects and features of this disclosure include a radio frequency identification (RFID) antenna multiplexer. The RFID antenna multiplexer includes multiple output ports. Each of at least some of the output ports is connectable to an antenna, however the connection may be direct or indirect. In operation, an output port can be connected to other kinds of devices, including additional RFID antenna multiplexers. The RFID antenna multiplexer includes an input port connectable to an RFID reader. A radio frequency (RF) switch is communicatively coupled to the output ports and the input port. A logic circuit is communicatively coupled to the RF switch. The logic circuit is configured to cause the RF switch to select an output port from among the multiple output ports based on a reduction in RF power from the reader at the input port.

In some examples, an RFID system includes an RFID reader and the RFID antenna multiplexer connectable between the RFID reader and multiple antennas. The RFID antenna multiplexer can be communicatively coupled to multiple antennas directly or through intervening RFID antenna multiplexers. The RFID antenna multiplexers are configured to select an antenna from among multiple antennas to communicatively couple to the RFID reader based on detecting a reduction in RF power from the RFID reader. An antenna can be selected based on the action of a single RFID antenna multiplexer or the actions of multiple interconnected RFID antenna multiplexers, including, as an example, a first RFID antenna multiplexer and additional RFID multiplexers in a chain, which together select an antenna.

In some examples, the RFID system is operated by a method that includes detecting, by the RFID reader, an external RFID antenna multiplexer and charging the external RFID antenna multiplexer by sending RF power from the RFID reader to an input port of the external RFID multiplexer so that the RFID antenna multiplexer is RF powered. The method includes reading control information at the external RFID multiplexer. The control information can include a connection sequence for output ports of the external RFID multiplexer. The method further includes selecting an output port from among output ports of the external RFID multiplexer based the control information and a reduction in RF power from the RFID reader.

In some examples, an RFID antenna multiplexer includes output ports connectable to an antenna either directly or through intervening devices and an input port connectable to an RFID reader. The RFID antenna multiplexer further includes an RF switch communicatively coupled to the output ports and the input port. The RFID antenna multiplexer further includes an energy harvester communicatively coupled to the input port to harvest signal energy from the RFID reader and a storage device communicatively coupled to the energy harvester to store the signal energy and supply power to the RFID antenna multiplexer using the signal energy. The RFID antenna multiplexer can be used within an RFID system as described above or can be used in an RFID system that includes signaling cable connected from the RFID reader.

DETAILED DESCRIPTION

Figure 1:
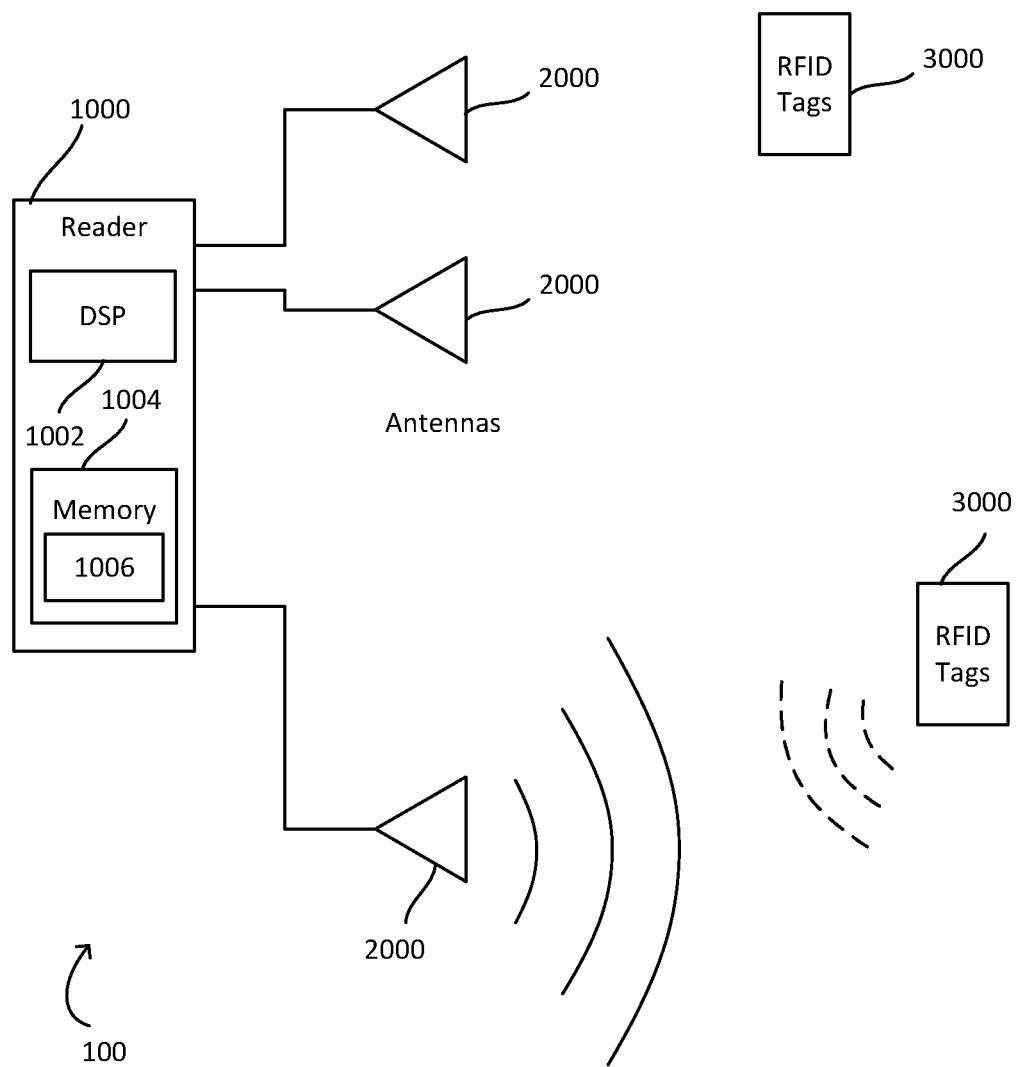
FIG. 1 is a system block diagram showing an example of an RFID system in which a reader according so some aspects of the present disclosure is connected to RFID antennas.

Certain aspects and features of the present disclosure relate to a system that improves, and makes more efficient, the installation and operation of RFID systems that make use of an external RFID antenna multiplexer (mux) or multiple such muxes and an RFID reader. Certain aspects and features relate to a mux that only requires the radio frequency (RF) connection to operate, for example, the mux may only require an RF coaxial cable (RF coax) running between the reader and the multiplexer. A control signaling cable is not required.

In some aspects, no control signaling interface or cable is needed because a mux detects a reduction in RF power indicative of switch timing. In some aspects, no DC power need be supplied to the mux, either distributed through the RF coax or otherwise. The external mux in such an example derives power by harvesting a small amount of signal energy from the reader's RF signal, converting it to a DC voltage, and storing it between RF transmissions. In some aspects, neither a control signaling connection nor a power connection is needed. These aspects and features reduce the cost, complexity, and installation time for RFID systems that make use of multiple antennas.

In some examples, an RFID mux includes an RF switch connected, or communicatively coupled, to output ports and an input port. A logic circuit is connected to the RF switch. The logic circuit is configured to cause the RF switch to select an output port from among the multiple output ports to connect, or communicatively couple, to the input port based on a reduction in RF power from the reader as detected at the input port.

In some examples, an RFID mux includes an energy harvester connected, or communicatively coupled, to the input port to harvest signal energy from the RFID reader. The RFID mux in this example further includes a storage device connected to the energy harvester to store the signal energy and supply power for the operation of the RFID antenna multiplexer using the signal energy. In further examples, the RFID mux includes the logic circuit configured to cause the RF switch to select an output port based on a reduction in RF power as well as the energy harvester and the storage device.

In some examples, an RF detector circuit is connected to the logic circuit and the input port of the RFID antenna multiplexer to detect the reduction in RF power at the input port. In some examples, the RFID antenna multiplexer includes an input switch connected to the logic circuit to program a connection sequence for the plurality of output ports. In some examples, the RFID antenna multiplexer includes an RFID chip readable by the RFID reader to identify the RFID antenna multiplexer. In some examples, the RFID chip can also be used to store information from the reader and to provide connectivity status information to the reader.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a system block diagram showing an example of an RFID system 100 in which a reader 1000 according so some aspects of the present disclosure is connected to RFID antennas 2000. The RFID reader 1000 has one or more antenna ports which are attached to antennas 2000. The reader 1000 transmits radio signals to RFID tags 3000 using one of the attached antennas 2000. The tags communicate back to the reader by modulating information in their radar cross section, thereby creating a modulated backscatter signal which the reader demodulates.

Without external antenna multiplexers, the number of antennas that can be connected to the reader 1000 of FIG. 1 is limited by the number of antenna ports that reader has. Reader 1000 includes a digital signal processor (DSP) 1002 and memory 1004. The memory serves as a non-transitory computer readable medium to store software 1006 (microcode, firmware, instructions, or the like) that is associated with the DSP and is executed on the DSP to operate RFID reader 1000. In this example, while no RFID antenna multiplexers are connected to reader 1000, software 1006 includes instructions that can reduce RF power to signal RFID antenna multiplexers according to some aspects of this disclosure, and optionally that can detect external muxes, charge the external muxes to initialize them to be RF powered, and send and receive control information as stored in the external muxes.

Figure 2:
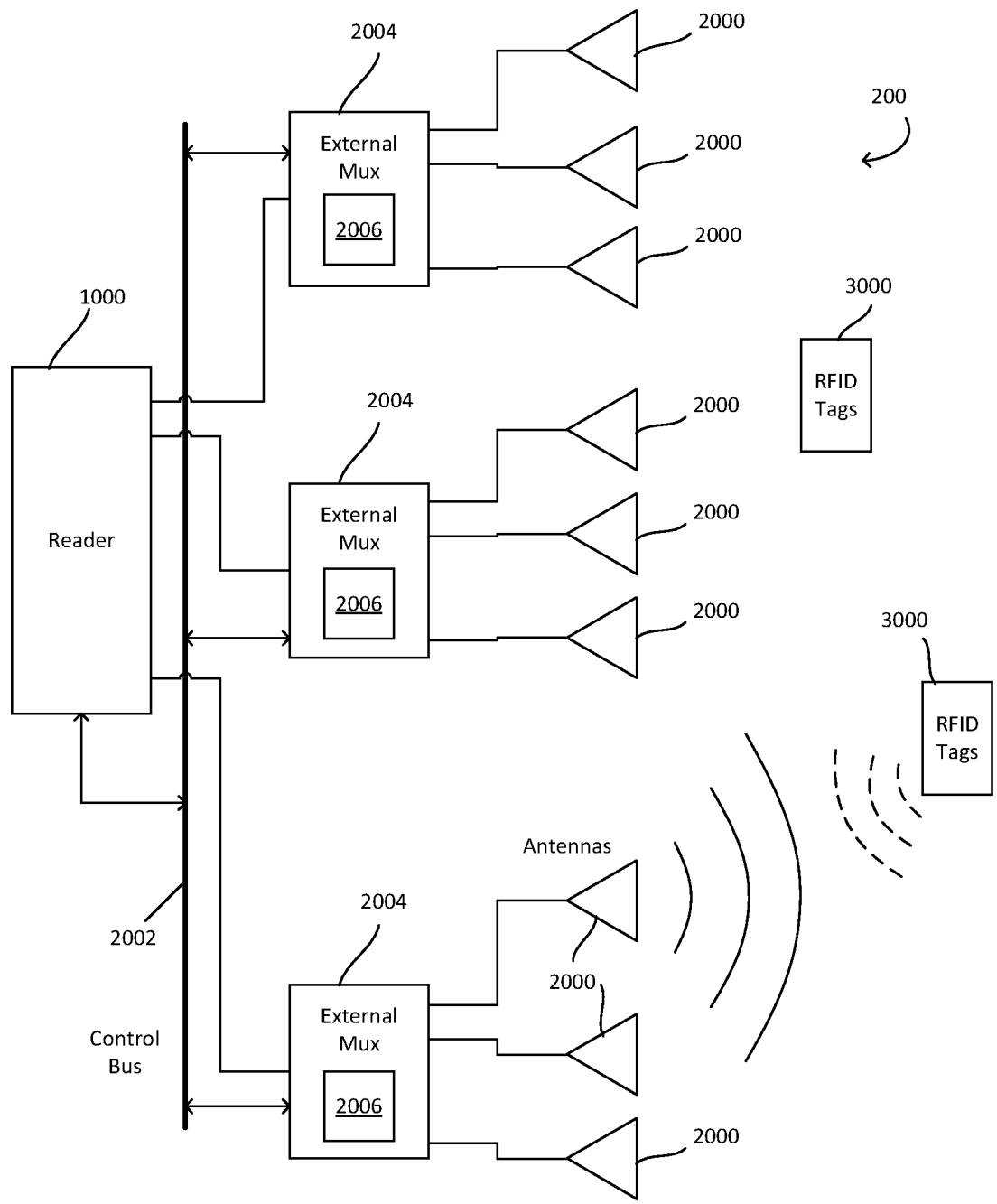
FIG. 2 is a system block diagram showing an example of an RFID system with a RFID reader connected to antennas through RFID antenna multiplexers according to some aspects of the present disclosure.

FIG. 2 is a system block diagram showing an example of an RFID system with a RFID reader connected to antennas through RFID antenna multiplexers according to some aspects of the present disclosure. System 200 as illustrated in FIG. 2 uses external antenna multiplexers to expand the number of antennas the reader is connected to. This allows a single reader to cover more area and, provide more read points, or both. This design uses a separate control bus 2002 to communicate with the external multiplexers 2004. However, external multiplexers 2004 include energy storage devices 2006 to eliminate the need to independently supply DC power to the muxes. The muxes also include an energy harvester and other power supply components (not shown) according to aspects of the present disclosure. Without the built-in components to supply power based on RF signal energy, DC power would need to be supplied to multiplexers 2004 either through the control bus 2002 or through the RF coaxial cable using bias tees.

Figure 3:
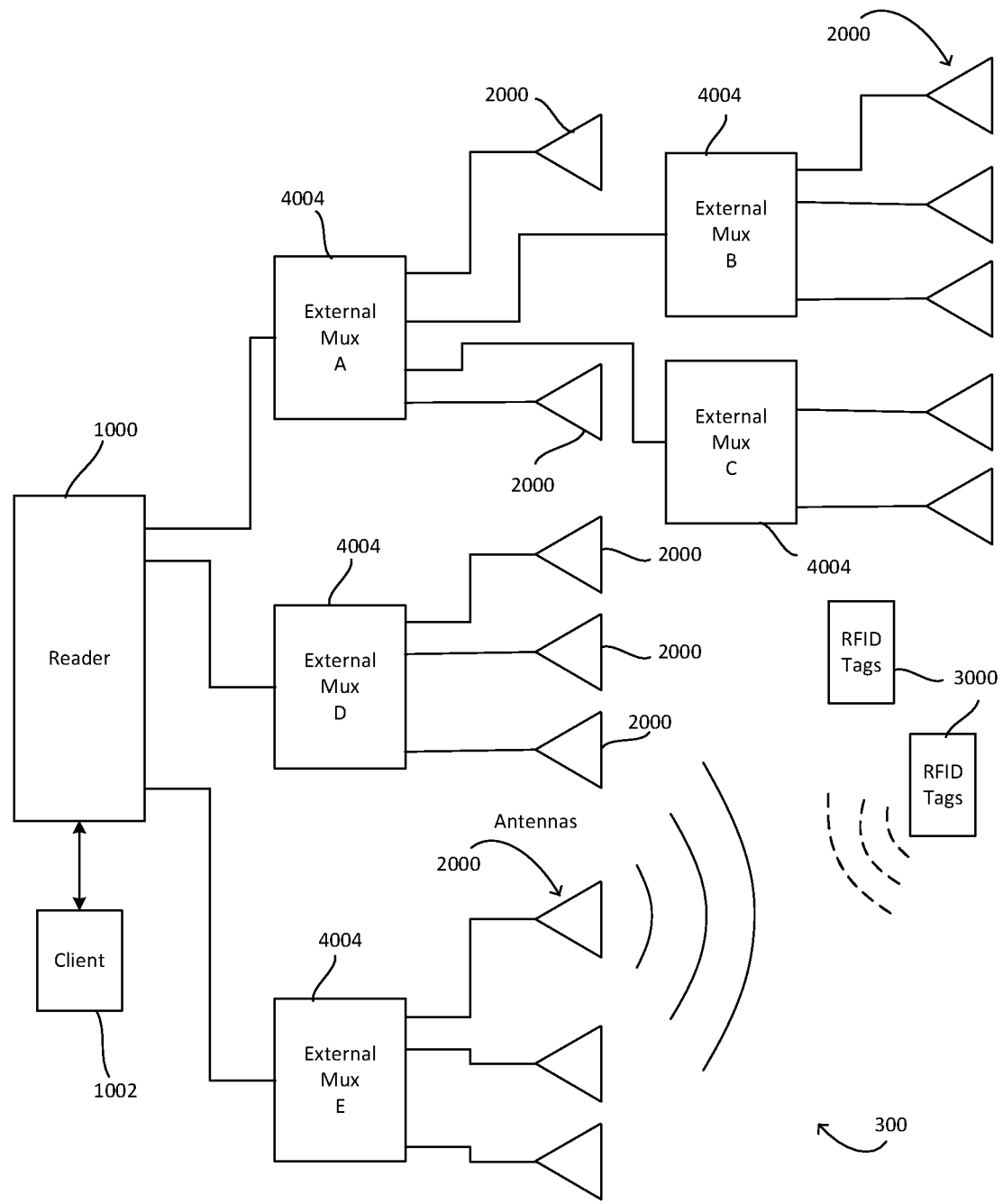
FIG. 3 is a system block diagram showing an example of an RFID system with an RFID reader connected to antennas through RFID antenna multiplexers according to additional aspects of the present disclosure.

FIG. 3 is a system block diagram showing an example of an RFID system with an RFID reader connected to antennas through RFID antenna multiplexers according to additional aspects of the present disclosure. The RFID reader 1000 can optionally interface with client 1002. Client 1002 can be a cloud-based client, a personal computer, an enterprise computer system or any other device or function that could be used obtain settings or input setup information via a network connection when needed. RFID system 300 uses the external RFID antenna multiplexers 4004 to expand the number of antennas used by the reader. This allows a single reader to cover more area, provide more read points, or both. In this example, the muxes 4004 include energy harvesting and storage. The muxes 4004 also include a logic circuit configured to cause the RF switch in the multiplexer to select an output port from among the multiple output ports to connect to the input port based on a reduction in RF power of the interrogation signal from the reader. Examples of RFID antenna multiplexers with both of these features are discussed in detail with reference to the remaining figures of this disclosure. However, an RFID multiplexer with only the energy harvesting and storage feature or only the switching of outputs based on RF power reduction features described herein can be implemented with appropriate components from any of the examples shown.

The design in the example of FIG. 3 does not require a separate control bus to configure the external multiplexers 4004 or cause the muxes to switch at appropriate times. The design also does not require DC power to be supplied to the muxes. This design provides substantial reduction in product and installation costs. Multiplexers 4004 allow daisy chaining or nesting. In this example, external muxes 4004 are identical but are illustrated with additional labels, namely, A, B, C, D, and E. These labels will be referred to later when describing initializing and charging the energy storage devices in the muxes.

Still referring to FIG. 3, the number of levels of muxes which may be nested in a system like system 300 depends on the minimum activation power of the external multiplexer 4004. For example, if the reader 1000 can generate 30 dBm of output power, and an external multiplexer 4004 has a minimum activation power of 20 dBm, then the multiplexers can be nested until the final unit in the daisy chain receives 20 dBm of input power. The nesting depth will depend on insertion loss of the multiplexers and cable losses. In order to design a system, a loss budget based on the desired antenna network topology can be determined. The insertion loss of the external multiplexer 4004 would typically be from 1 dB to 1.5 dB.

Figure 4:
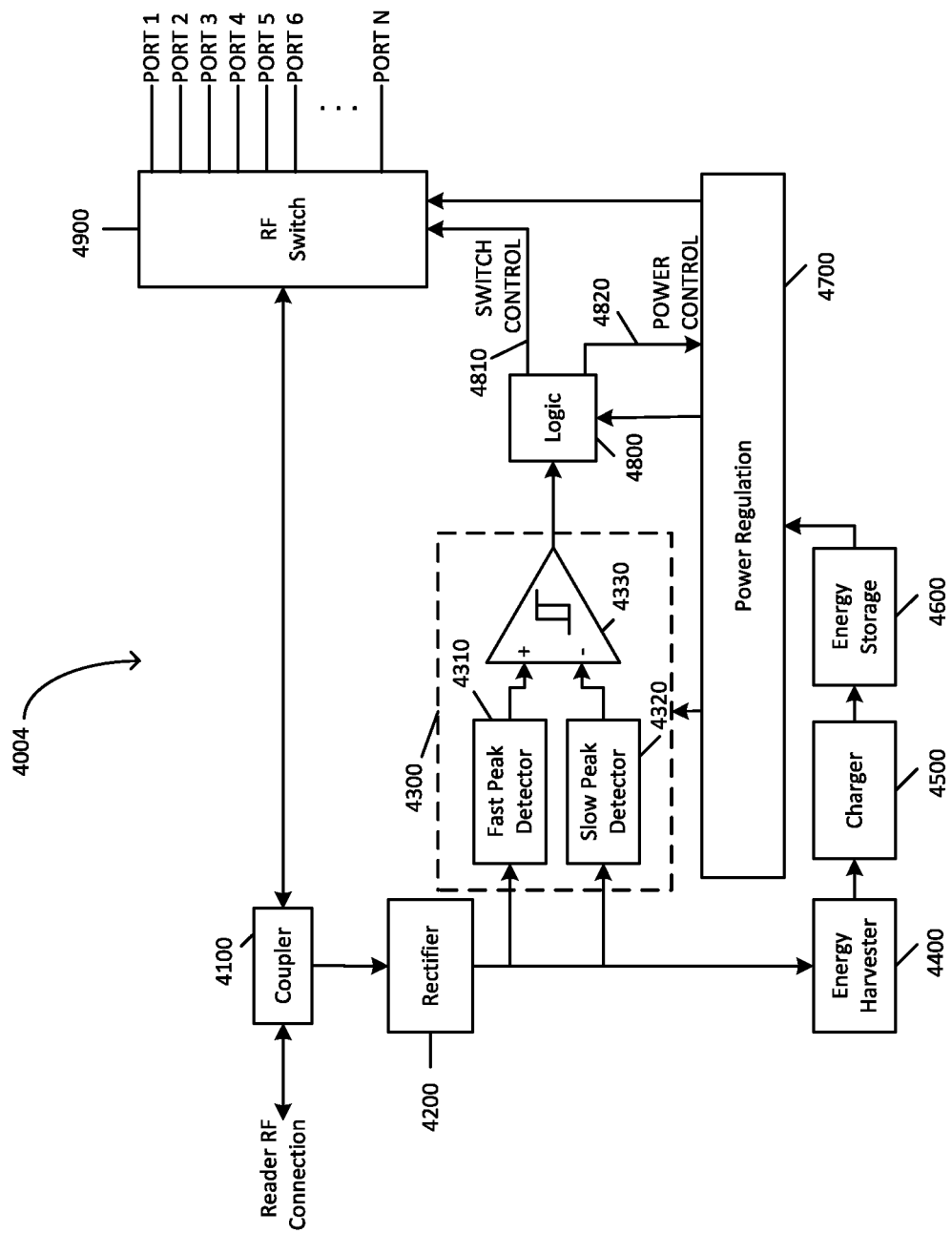
FIG. 4 is a schematic block diagram of an external RFID antenna multiplexer according to some aspects of the present disclosure.

FIG. 4 is a schematic block diagram of an external RFID antenna multiplexer according to some aspects of the present disclosure. The reader RF connection of the mux 4004 is connected to the reader's antenna port. Coupler 4100 samples a portion of the reader's radio signal and passes the sample into a rectifier 4200, which performs alternating current to rectified current conversion such as full-wave rectification, half-wave rectification, or similar. The rectified signal is supplied to the energy harvester 4400. The energy harvester 4400 is a device or circuit which extracts power from highly variable and high output impedance sources, such as radio signals, thermal energy, photodetectors, etc. Such energy harvesters are available in chip form. The energy harvester 4400 provides a variable power input to a charger 4500. The charger 4500 manages charging an energy storage device such as a battery or capacitor. In this example, charger 4500 transfers power from the energy harvester 4400 into the energy storage device 4600 with high efficiency. Charger 4500 also monitors the charge level to avoid overcharging, and in some cases to avoid undervoltage. Chargers are also available in chip implementations. Charger 4500 uses the harvested power to charge the energy storage device 4600. In some examples, energy storage device 4600 is a capacitor. Since the energy system can power the mux without a battery in such an example, the cost and maintenance time that would otherwise be required if a battery were used is avoided.

Still referring to FIG. 4, the energy storage device 4600 provides input power to the power regulation subsystem 4700. The power regulation subsystem 4700, in turn, provides regulated power to the entire mux. The power regulation subsystem in this example includes one or more buck regulators, one or more low drop out linear regulators, or both. Buck regulators provide higher efficiency but are typically noisier than linear regulators. For example, a linear regulator output would typically be used to power the RF switch 4900. The RF off detector 4300 must detect when the input radio signal from the reader is shut off, or reduced to such a low level that it can be presumed to be logically off for purposes of controlling the switching of the mux. In the example of FIG. 4, the RF detector includes fast peak detector 4310 and a slow peak detector 4320. The two detector outputs are input to a comparator 4330, which determines when the fast peak detector output has fallen below the slow peak detector output. The time constants or bandwidth of the fast and slow peak detectors are set such that the detectors are slow enough to ignore or not respond to RFID command modulation but are fast enough to detect an RF off event (when the reader shuts off its RF output to the multiplexer 4004 to cause the multiplexer to switch or advance in its switching sequence). The RF detector circuit 4300 determines when the RF signal has powered off and passes that information to the logic circuit 4800. RF detector circuit 4300 may be referred to as a radio off detector.

Continuing with FIG. 4, the logic circuit 4800 changes the switch control output 4810 to the RF switch 4900. The logic circuit 4800 in this example also provides a power control signal 4820 to the power regulation subsystem 4700 so that the power to other subsystems within multiplexer 4004 can be disabled. Normally the logic circuit 4800 would sequence through a specific sequence of ports, for example, Port 1, Port 2, . . . , Port N, then repeat. Optionally, the logic circuit 4800 can include timing detection such that some predetermined pattern of reader RF off events signals to logic circuit 4800 to alter the sequence in some way. For example, two RF off events 3 milliseconds apart would not occur in normal operation of a RAIN-based RFID system (RAIN-based RFID is also known as RFID based on the Gen2, ISOC, ISO-63, or ISO 18000-63 standards). Such a sequence of two or more RF off events may be used to control or preset the port sequence in the logic circuit 4800. In some examples, the port selection sequence can be determined by the logic circuit. However, the port selection sequence can also be externally programmed, as discussed below.

Figure 5:
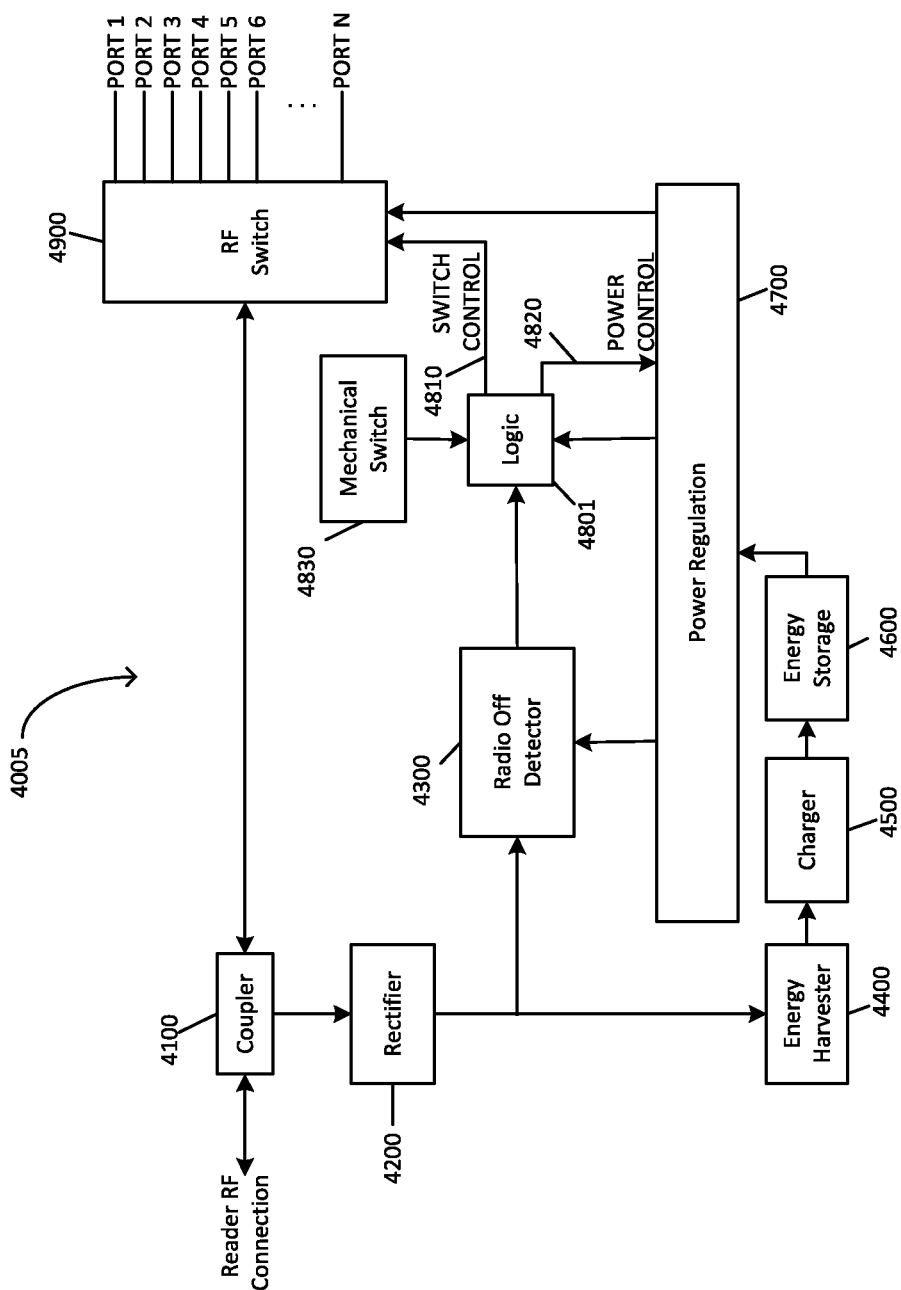
FIG. 5 is a schematic block diagram of an external RFID antenna multiplexer according to further aspects of the present disclosure.

FIG. 5 is a schematic block diagram of an external RFID antenna multiplexer according to further aspects of the present disclosure. The example of FIG. 5 includes a mechanical input switch 4830. In this example, input switch 4830 is used to specify the order of the ports connected to the input port of the multiplexer, which is used for the reader RF connection. Examples of a mechanical switch include a rotary switch, and a DIP switch. The same switch or additional switches can also be used specify the initial port to connect in response to an initialization sequence. While the example shown in FIG. 5 includes a mechanical switch to program a connection sequence, an input switch can also take the form of an electronic switch, or can be implemented in software (firmware) that is used to implement the RFID antenna multiplexer.

By default, an external multiplexer can sequence through the connected output ports in some predetermined order or a circular fashion (e.g. 1, 2, . . . , N−1, N, 1, . . . ). In some applications it may be desirable to daisy chain or nest the external multiplexer as shown in FIG. 3 with multiplexers labeled A, B, and C. In such circumstances it may be desirable to program an alternative mux sequence.

Figure 6:
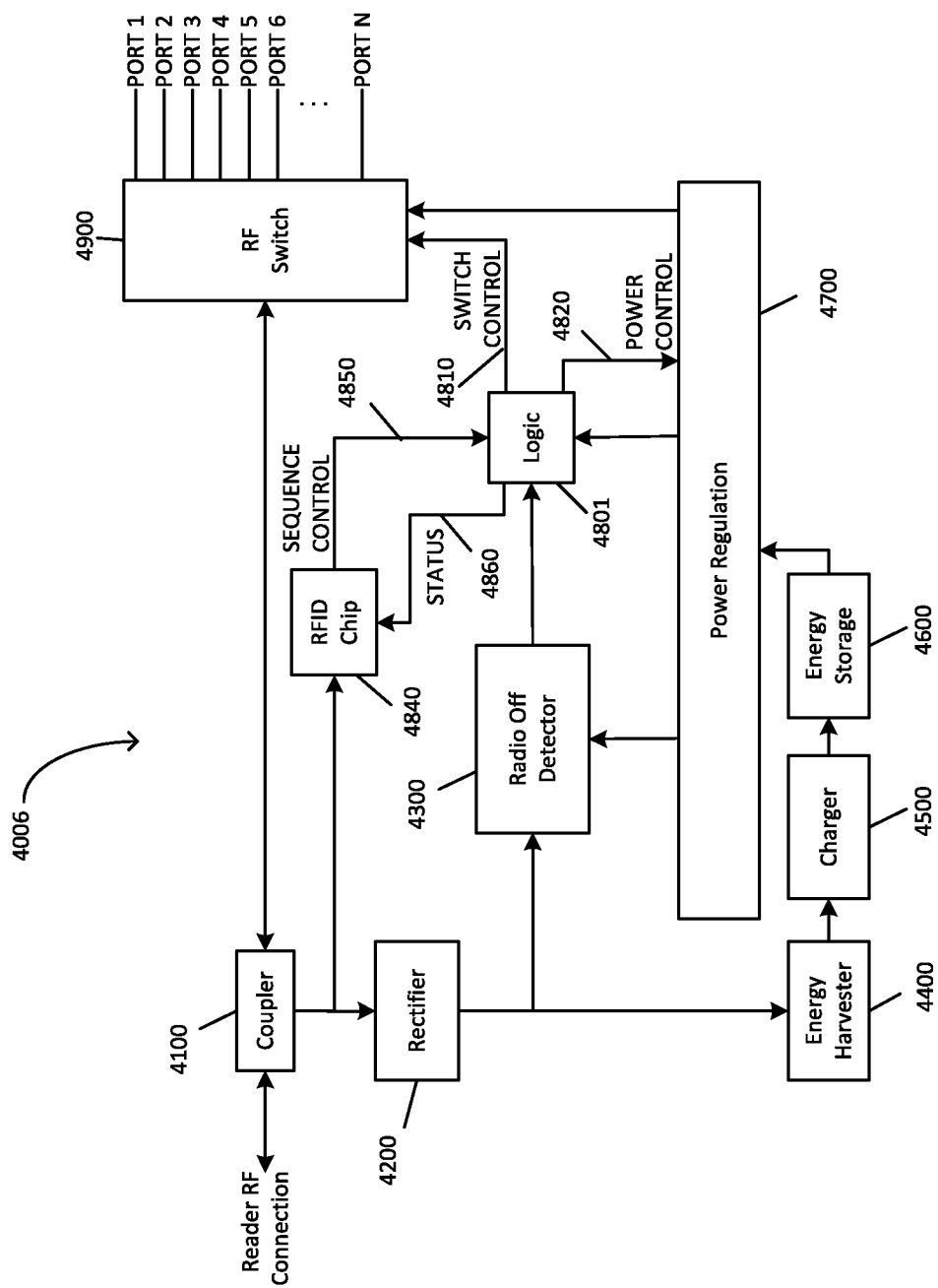
FIG. 6 is a schematic block diagram of an external RFID antenna multiplexer according to additional aspects of the present disclosure.

FIG. 6 is a schematic block diagram of an external RFID antenna multiplexer according to additional aspects of the present disclosure. External RFID antenna multiplexer 4006 includes an RFID chip 4840 for enhanced logic control. An RFID chip with a backend serial interface communication channel (e.g. I2C or SPI) can be used. In this example, the logic circuit 4801 can obtain port sequencing control from the RFID chip interface. This allows the RFID reader full control of the port sequencing. The inclusion of such an RFID chip configures the RFID antenna multiplexer to read the control information from the RFID chip and the RFID reader 1000 is configured by its software to write the control information to the RFID chip. The control information can provide port sequencing as well as any other desired function such as startup management, power management, etc.

As an additional benefit, the integrated RFID chip 4840 in FIG. 6 allows the reader 1000 to determine if an external mux is attached to one of its antenna ports and identify the specifics of the mux. The RFID tag function of the chip is readable by the RFID reader to identify the RFID antenna multiplexer. The RFID chip 4840 may uniquely identify itself as an external switch with its unique serial number. This feature allows the reader to determine if any external multiplexers are present on any of its antenna ports and, furthermore, allows the reader to identify the connection topology of the external multiplexers to efficiently control the antenna sequencing.

FIG. 6 shows a sequence control input 4850 passing from the RFID chip 4840 to the logic circuit 4801. In some examples, logic circuit 4801 also passes connectivity status information to the RFID chip for feedback to the reader 1000 via status output 4860. This status information can be used or stored by the reader. Additionally, this or other information can be displayed on display 1002 for evaluation by a user or technician. The RFID reader 1000 identifies any external mux connected by reading the product code and serial number stored in the embedded RFID chip 4840. The reader 1000 sends commands to the mux logic circuit 4801 and receives responses from the logic circuit 4801 through the RFID chip 4840. This arrangement gives the reader complete, programmatic control over the external multiplexer(s) 4006 without requiring any data cable connections.

Figure 7:
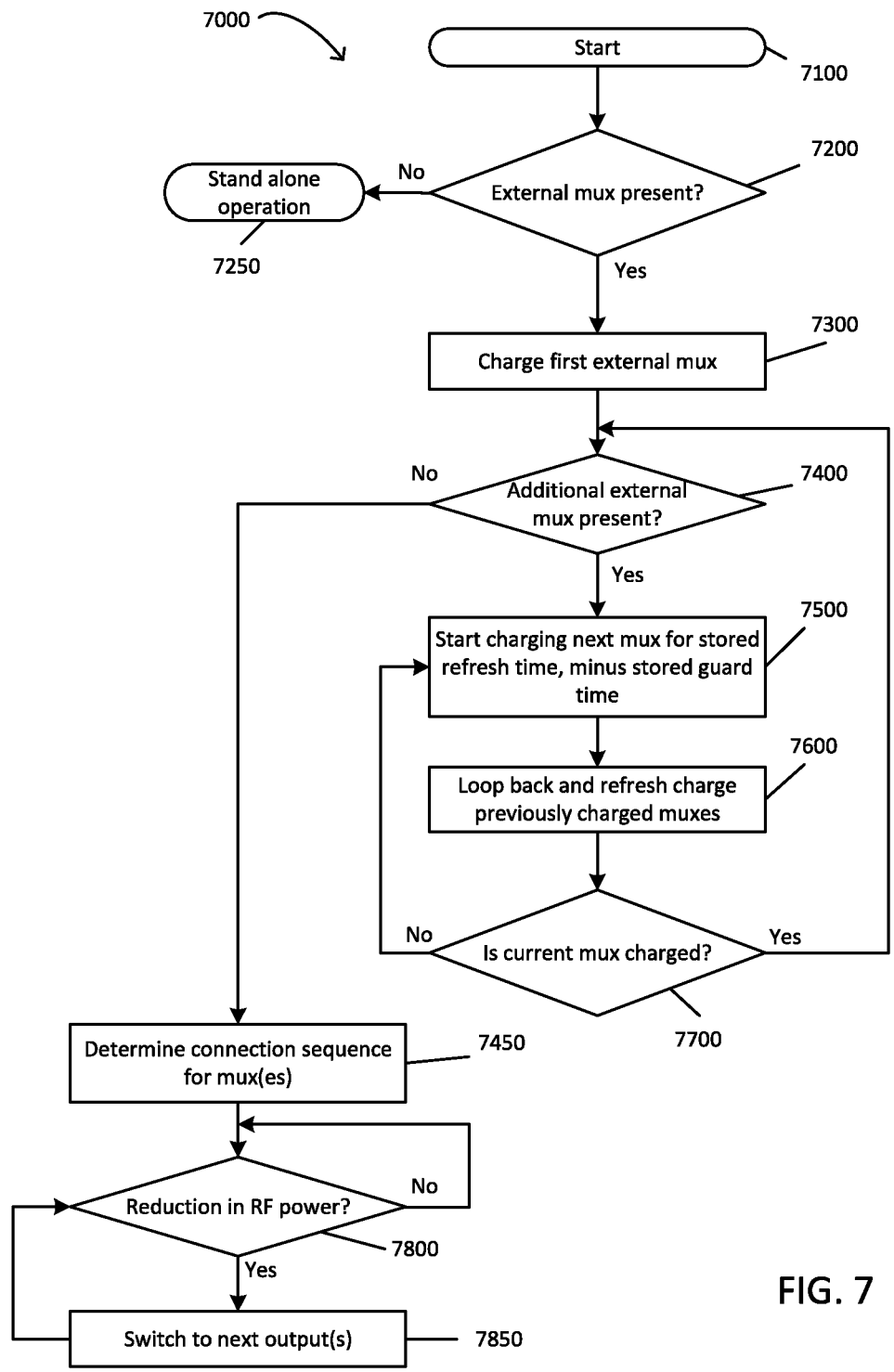
FIG. 7 is a flowchart illustrating an example of the operation of an RFID system according to some aspects of the present disclosure.

The coupler 4100 shown in the examples herein can be a 10 dB or 20 dB coupler. For RFID readers transmitting one watt, or 30 dBm, this means that the RF power applied to the rectifier 4200 is on the order of one milliwatt, or 0 dBm. Thus, initial charging of the energy storage device 4600 could take some time, for example, several seconds to several minutes, depending on the RF power input and how much capacitance is used in the energy storage device 4600. The reader 1000 will need to manage the initial charging of the energy storage device(s) 4600 on startup. FIG. 7 is a flowchart illustrating an example of processor-controlled operations of an RFID system according to some aspects of the present disclosure. Process 7000 illustrated in FIG. 7 includes the startup sequence.

Process 7000 in this example begins at block 7100 from a reset or reboot. At block 7200, the reader determines if any external muxes are present, and goes directly into steady state, stand-alone operation at block 7250 if not. To determine if any external mux is present, the reader may have configuration variables or files set through a user interface. Alternatively, if an RFID chip 4840 is used in the muxes, then the reader can directly query for external multiplexers via the RAIN RFID interface. If there are external muxes, control passes to block 7300, where the first external mux is charged by sending an RF signal to the input port of the first mux for an appropriate amount of time in order to charge the mux. If a no-feedback system design is used, the reader may wait some predetermined time. Alternatively, if the logic circuit 4801 can provide feedback, as may be the case when using an RFID chip 4840, then the reader 1000 can query the logic circuit 4801 to report the charge state. At block 7400 of process 7000, the reader determines if there are additional external muxes present. If not, then control passes to steady state operation beginning with block 7450. Otherwise, the reader starts charging an additional RFID antenna multiplexer at block 7500 using the stored refresh time and stored guard time.

In some examples, with optimized algorithms, the sub-process of block 7500 may run for a limited amount of time due to the requirement to refresh the energy storage level for previously charged muxes. The reader 1000 may identify and store a connection topology for the RFID antenna multiplexers. In some examples, the topology is stored by creating a data structure representation of the topological map of nested external RFID antenna multiplexers connected in the system. The RFID reader can be configured to energize some of the RFID antenna multiplexers more frequently than other of the plurality of RFID multiplexers. The reader 1000 may keep track of the charge state of the various leaf multiplexers in the antenna network. A leaf multiplexer is any multiplexer which does not have another multiplexer attached to any of its outputs. In FIG. 3, for example, external multiplexers B, C, D, and E are all leaf multiplexers. External multiplexer A is not a leaf multiplexer. The reader 1000 may maintain an inventory schedule such that leaf multiplexers are energized often enough to remain ready continuously. This technique will be further discussed below with respect to FIG. 9.

Still referring to FIG. 7, after charging an additional mux at block 7500 until previously charged muxes must be refreshed, the reader proceeds in block 7600 to loop the RF charging signal back through all previously charged muxes. At block 7700, the reader determines if the currently charging mux has been fully charged. If not, control passes back to block 7500 to continue charging. If so, control returns to block 7400 to check for additional external multiplexers. Once charging is complete, connection sequences are determined within the system at block 7450, either at the muxes themselves or by the reader accessing previously stored control information and sending the control information to the muxes. The reader transmits interrogation signals through the muxes at block 7750. Each mux monitors for a reduction in the RF power of the interrogation signal at block 7800, and switches to the next output in its sequence at block 7850 when the reduction in RF power is detected. This, transmitting, monitoring and switching continues until the system is shut down, reset or rebooted.

In some examples, the RFID reader includes a stored value for a configuration variable that enables the reader to work with the muxes described herein. With this function enabled in the reader, the reader will automatically discover any muxes connected, even if they are not charged or even if a charged mux gets moved to a new location. In some examples, the reader always maintains a stored connection topology of the attached antenna network. In some examples, the reader can be made to override and control the port switching connection sequence of muxes, for example, based on manual input using client 1002.

Figure 8:
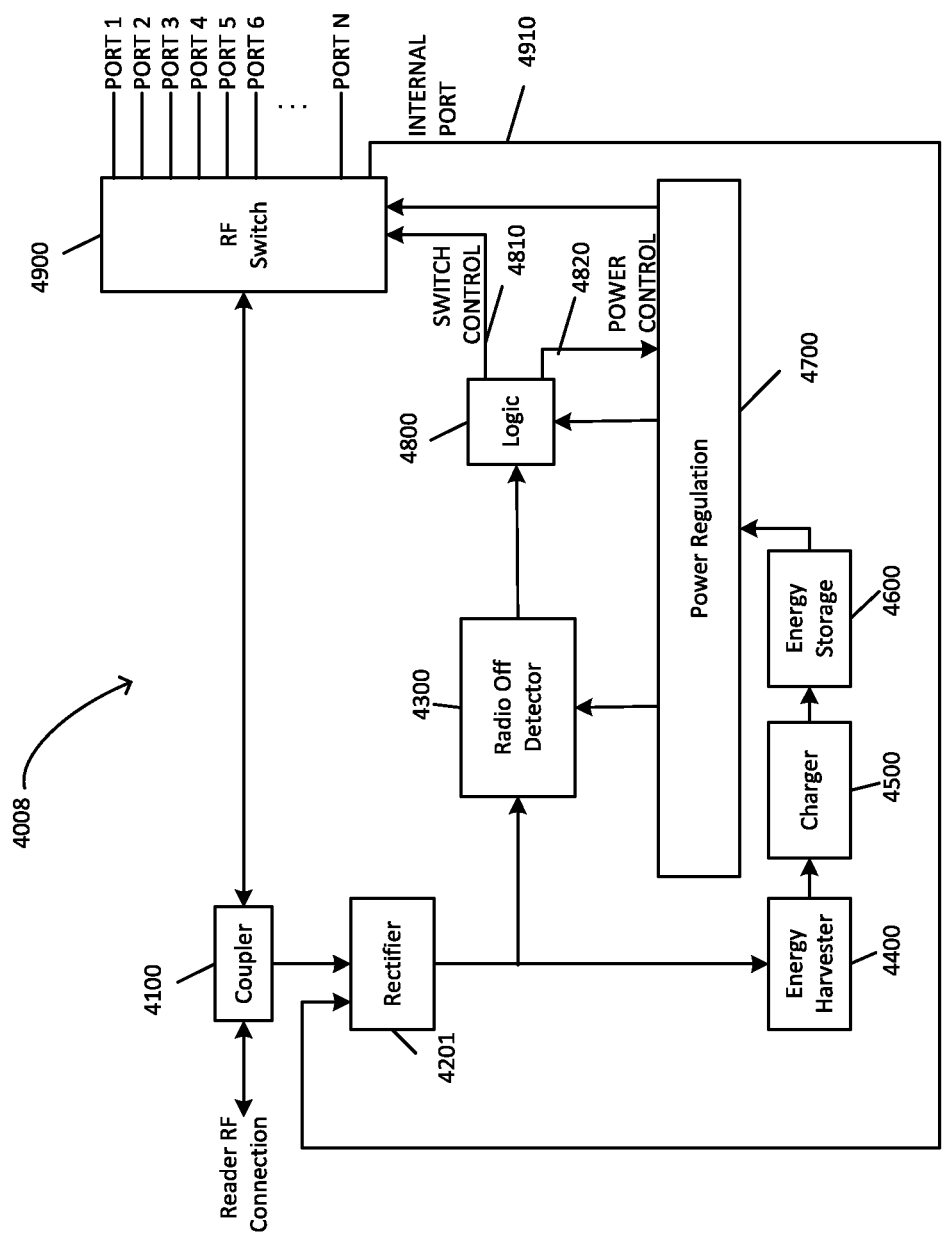
FIG. 8 is a schematic block diagram of an external RFID antenna multiplexer according to further aspects of the present disclosure.

FIG. 8 is a schematic block diagram of an external RFID antenna multiplexer according to further aspects of the present disclosure. In FIG. 8, one of the switch ports is connected to the energy harvester through the rectifier to supply additional energy to the energy harvester. Mux 4008 includes internally terminated port 4910 which routes essentially all the RF power available at the RF switch 4900 back into the rectifier 4201, the energy harvester 4400 and the charger 4500 for faster charging of the energy storage device 4600. Internal port 4910 can be selected by the logic circuit 4800, or port 4910 can be set as the default port when the logic circuit 4800 is powered down, such that all the available RF power is routed to the rectifier 4201. Rectifier 4201 may include a combiner to sum or switch the coupled RF power from coupler 4100 and the internal port 4910 into the rectifier 4201. The output of the rectifier passes to the energy harvester 4400, charger 4500, and into the energy storage device 4600. The internal port, the rectifier with the combiner, or both, may be used in any of the examples of an RFID antenna multiplexer shown herein, including multiplexers 4004, 4005, or 4006.

To keep an external mux from depleting its energy storage device, the reader can regularly provide RF power to the external mux. The maximum time allowable between RF power applications at the reader RF input of the external mux is the maximum refresh time. The reader must ensure that all external muxes are refreshed at least as often as this maximum refresh time. The maximum refresh time may be reduced by a guard time to allow for switching. There are many ways to accomplish this. For example, the reader can be programmed to establish a maximum dwell time per mux and a guard time per mux based on the number of muxes and topology and to store these times for use during steady state operation.

The RFID reader can be configured to energize some of the connected RFID antenna multiplexers more frequently than others. For example, when external muxes according to aspects of this disclosure are daisy chained or nested, only muxes at the end of the daisy chain or nesting topology need to be considered for the energy storage refresh period. As previously mentioned, these muxes can be referred to as leaf muxes, meaning these muxes are at the tip of a mux tree topology. The non-leaf muxes always get refreshed whenever a leaf in that tree gets refreshed. For example, in FIG. 3, muxes B, C, D, and E are leaves, while A is not. Mux A gets refreshed whenever B or C does, or whenever any of the antennas connected to mux A are used. Therefore, with respect to charge refresh interval management by the reader 1000, only the leaf multiplexers matter.

Figure 9:
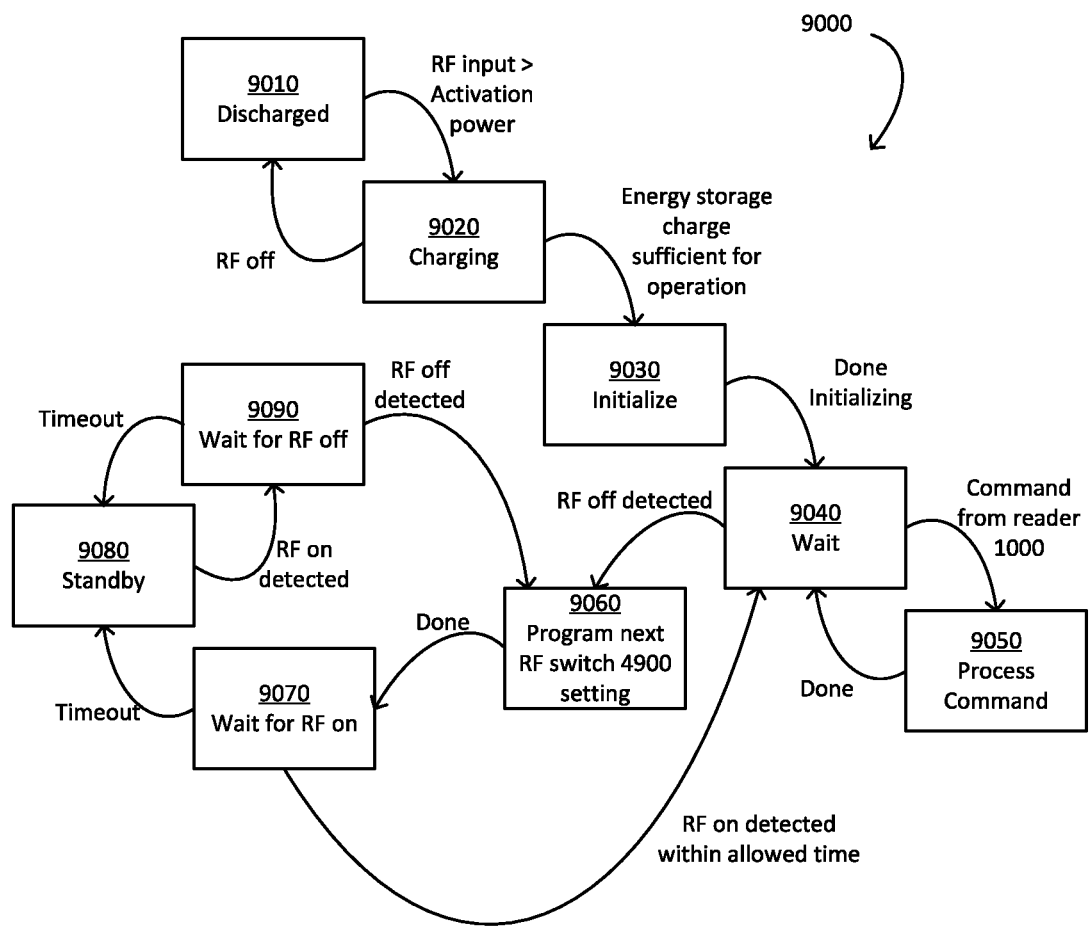
FIG. 9 is a state transition diagram showing an example of the operating states of an external RFID antenna multiplexer according to some aspects of the present disclosure.

FIG. 9 is a state transition diagram 9000 showing an example of the operating states of an external RFID antenna multiplexer according to some aspects of the present disclosure. The mux starts in state 9010, the discharged state. When an RF input signal with a level above the activation threshold is provided, the mux transitions to the charging state, 9020. If the RF input signal is removed prior to the mux being sufficiently charged to operate, the mux returns to discharged state 9010. If the charging produces sufficient operating voltage then the mux transitions to state 9030, the initialize state. In this state, the logic resets the mux components for operation. After this initialization is complete, the state transitions to waiting at 9040, where the mux waits for the RF signal to be removed, or optionally for a command from the reader 1000 if the mux is designed to accept and respond to commands. Commands are handled in process command state 9050. When the RF signal is turned off, the mux transitions to programming state 9060, where it directs the RF switch 4900 to change to the next port in the designed or commanded port connection sequence. After the switching, the mux transitions to wait state 9070, where it waits for the RF signal to be turned back on. If the RF signal is not detected within some configured timeout interval, for example, 50 milliseconds, then the mux transitions to a low power standby state 9080. In this mode, the mux is charged and ready to operate, but waits for the RF signal to come back up before enabling the RF switch and possibly other subsystems. Alternatively, from within state 9070, if the RF signal is returned to an on state within the allowed amount of time, the mux transitions back to wait state 9040. In this example, if the mux enters standby state 9080, the mux leaves the standby state when the RF signal is detected. The RF signal detection can be accomplished with a circuit similar to the RF signal off detector 4300 shown in detail in the example of FIG. 4.

Figure 10:
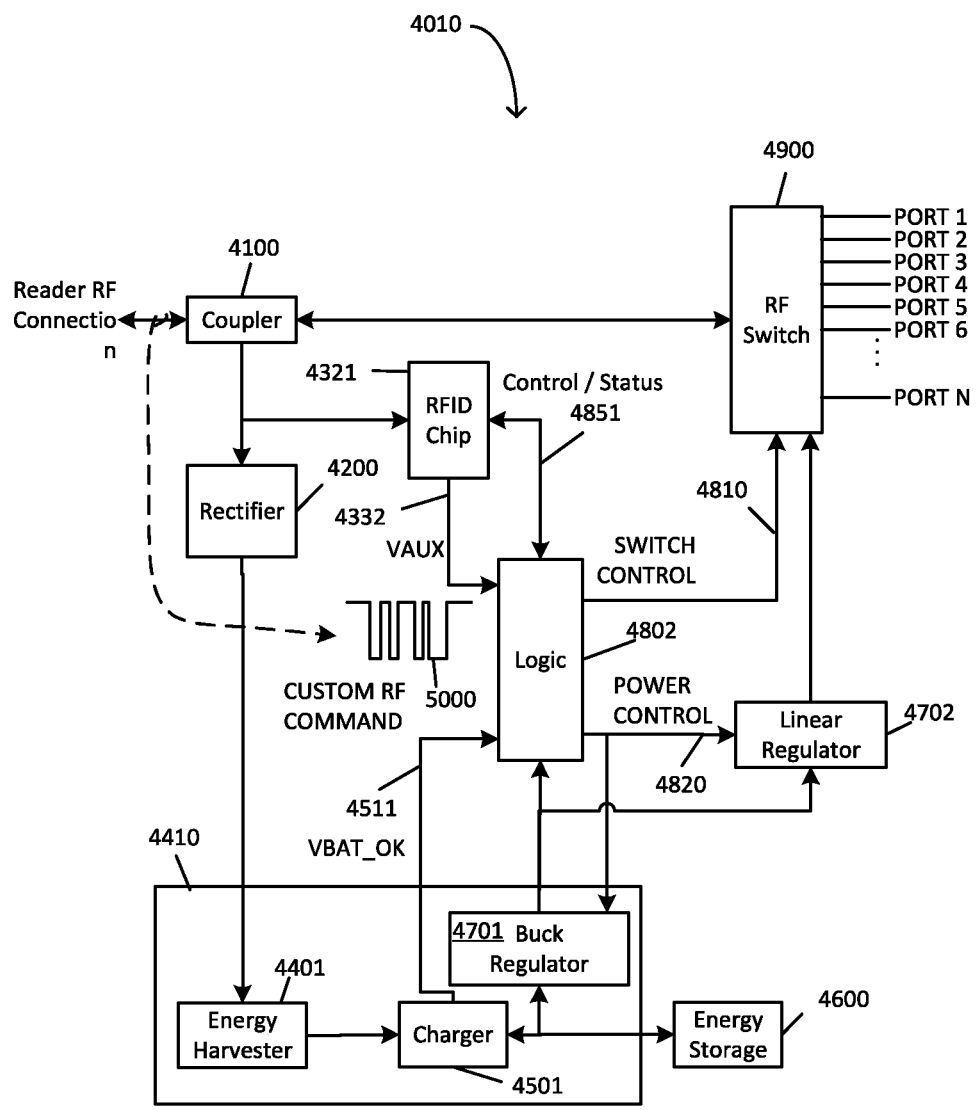
FIG. 10 is a schematic block diagram of an external RFID antenna multiplexer according to additional aspects of the present disclosure.

FIG. 10 is a schematic block diagram of an external RFID antenna multiplexer according to additional aspects of the present disclosure. RFID antenna multiplexer 4010 includes an RFID chip 4321 with an RF on detection output. Using RF on detection, the mux state transitions to wait state 9090 described above, where it waits for the RF signal to turn off, since the RF switch 4900 cannot be powered on and change outputs while the RF signal is on. Switching while the RF signal is on can cause spurious RF emissions exceeding regulatory limits. In wait state 9090, when RF off is detected, the mux transitions to programming state 9060. If the energy storage device 4600 becomes depleted so that its output voltage falls below the required operating voltage for the mux at any time, such as during long periods of standby or when the RF input drops below the minimum activation power threshold for prolonged periods, then the mux will automatically return to the discharged state 9010.

Still referring to FIG. 10, the RFID chip 4321 features a bidirectional SPI interface 4851 for control and status information as well as a RF detection output (VAUX) 4332. The 4851 and 4332 signals connect to the logic circuit 4802. In this example, the energy harvester 4401, charger 4501, and a buck regulator 4701 are all integrated into a single chip package 4410. The charger 4501 has a VBAT_OK output 4511 which signals to the logic circuit 4802 that the system is charged sufficiently to enable the buck regulator 4701 and the linear regulator 4702, which supplies the RF switch 4900 with clean power. The single chip package shown here as well as discrete implementations with an energy harvester, charger, and buck converter can be used with any of the examples of RFID antenna multiplexers shown herein, including multiplexers 4004, 4005, 4006, and 4008. The internal port charging illustrated with respect to multiplexer 4008 can also be used with multiplexer 4010 of FIG. 10.

Continuing with FIG. 10, the VAUX signal 4332 converts an amplitude modulated RF signal at the reader RF connection into a digital custom RF command 5000 at the logic circuit input. Decoding the amplitude modulated RF signal into a baseband digital signal can be accomplished in any number of ways. The RFID chip provides this function together with the RAIN RFID functionality and the SPI interface 4851. The value of the custom RF command 5000 is that the reader 1000 and external RFID antenna multiplexer 4010 may implement a fully custom command set that bypasses the need to singulate the RFID chip and put the RFID chip into access mode. Implementing custom RF commands 5000 allows the reader 1000 to control the external multiplexer 4010 much more quickly than by using the SPI interface 4851 through a RAIN RFID access sequence.

In order to implement the functions of the devices described herein, a general-purpose processor such as a DSP, microcontroller embedded controller, or microprocessor can be used and firmware, software, or microcode can be stored in a tangible or non-transitory storage medium that is associated with a processor. Such a storage medium may be a memory integrated into the processor, or may be a memory chip that is addressed by the processor to perform control functions. Such firmware, software or microcode is executable by the processor and when executed, causes the processor to perform its control functions. Such firmware or software could also be stored in or on a tangible medium such as an optical disk or traditional removable or fixed magnetic medium such as a disk drive used to load the firmware or software into an RFID device. An RFID device in this context can refer to a reader, a mux, some other device, or any combination of the foregoing.

The reader described as an example in this disclosure may also be implemented using a discrete component RFID reader design, such as one based on physically separate chips for DACs, ADCs, mixers, amplifiers, couplers, and the like. A processing function for a reader, the logic circuit for an RFID antenna multiplexer, as well as additional functional bocks or circuits in the reader or multiplexer can be implemented on a field programmable gate array (FPGA), or on an application specific integrated circuit (ASIC). A reader or mux may also be implemented as a system-on-a-chip (SoC), wherein many of the subsystems are integrated together on a chip. Sometimes multichip SoC solutions can be used to ease manufacturability given the variations in process which may be required based on frequency, power, and the like.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

The invention claimed is:

1. A radio frequency identification (RFID) antenna multiplexer comprising:
a plurality of output ports, at least some of the output ports connectable to an antenna;
an input port connectable to an RFID reader;
a radio frequency (RF) switch communicatively coupled to the plurality of output ports and the input port; and
a logic circuit communicatively coupled to the RF switch, the logic circuit configured to cause the RF switch to select an output port of the plurality of output ports to be communicatively coupled to the input port based upon a reduction in RF power at the input port.

2. The RFID antenna multiplexer of claim 1 further comprising:
an energy harvester communicatively coupled to the input port to harvest signal energy from the RFID reader; and
a storage device communicatively coupled to the energy harvester to store the signal energy and supply power to the RFID antenna multiplexer using the signal energy.

3. The RFID antenna multiplexer of claim 2 wherein at least one of the plurality of output ports is communicatively coupled to the energy harvester to supply additional energy to the energy harvester.

4. The RFID antenna multiplexer of claim 2 wherein the storage device is a capacitor.

5. The RFID antenna multiplexer of claim 1 further comprising an RF detector circuit communicatively coupled to the logic circuit and the input port to detect the reduction in RF power at the input port.

6. The RFID antenna multiplexer of claim 1 further comprising an input switch communicatively coupled to the logic circuit to program a connection sequence for the plurality of output ports.

7. The RFID antenna multiplexer of claim 1 further comprising an RFID chip readable by the RFID reader to identify the RFID antenna multiplexer.

8. The RFID antenna multiplexer of claim 7 wherein the RFID chip is communicatively coupled to the logic circuit to receive connectivity status information from the logic circuit and provide the connectivity status information to the RFID reader.

9. A radio frequency identification (RFID) system comprising:
an RFID reader; and
an RFID antenna multiplexer connectable between the RFID reader and a plurality of antennas, the RFID antenna multiplexer configured to select an antenna of the plurality of antennas to communicatively couple to the RFID reader based on detecting a reduction in RF power from the RFID reader.

10. The RFID system of claim 9 wherein the RFID antenna multiplexer further comprises:
an energy harvester to harvest signal energy from the RFID reader; and
a storage device communicatively coupled to the energy harvester to store the signal energy and supply power to the RFID antenna multiplexer using the signal energy.

11. The RFID system of claim 9 wherein the RFID antenna multiplexer further comprises an input switch to program a connection sequence.

12. The RFID system of claim 9 wherein the RFID antenna multiplexer further comprises an RFID chip readable by the RFID reader to identify the RFID antenna multiplexer.

13. The RFID system of claim 12 wherein the RFID chip is configured to provide status information to the RFID reader.

14. The RFID system of claim 13 wherein the RFID reader is configured to write control information to the RFID chip and the RFID antenna multiplexer is configured to read the control information from the RFID chip.

15. The RFID system of claim 14 wherein the RFID antenna multiplexer comprises a plurality of RFID antenna multiplexers, and wherein the RFID reader is configured to identify and store a connection topology for the plurality of RFID antenna multiplexers.

16. The RFID system of claim 15 wherein the RFID reader is configured to energize some of the plurality of RFID antenna multiplexers more frequently than other of the plurality of RFID multiplexers.

17. A method comprising:
detecting, by a radio frequency identification (RFID) reader, an external RFID antenna multiplexer;
charging the external RFID antenna multiplexer by sending radio frequency (RF) power from the RFID reader to an input port of the external RFID multiplexer;
reading control information at the external RFID multiplexer, the control information including a connection sequence for a plurality of output ports of the external RFID multiplexer; and
selecting an output port of the plurality of output ports of the external RFID multiplexer based the control information and a reduction in RF power from the RFID reader.

18. The method of claim 17 further comprising:
charging an additional RFID antenna multiplexer by sending the RF power to the additional RFID multiplexer; and
refresh charging the external RFID antenna multiplexer prior to selecting the output port.

19. The method of claim 18 wherein the refresh charging is limited to a stored maximum refresh time reduced by a stored guard time.

20. The method of claim 17 further comprising:
determining, by the RFID reader, a connection topology for at least the external RFID antenna multiplexer and the additional RFID antenna multiplexer; and
storing the connection topology in the RFID reader.

21. A radio frequency identification (RFID) reader comprising:
a processor; and
a non-transitory medium including instructions that are executable by the processor for causing the processor to perform operations comprising:
detecting at least one external RFID antenna multiplexer;
charging the at least one external RFID antenna multiplexer by sending radio frequency (RF) power from the RFID reader to the at least one external RFID multiplexer;
transmitting an interrogation signal through the external RFID multiplexer; and
reducing the RF power of the interrogation signal to cause the external RFID multiplexer to advance in a switching sequence.

22. The RFID reader of claim 21 wherein the at least one external RFID antenna multiplexer comprises a plurality of external RFID antenna multiplexers, the operations further comprising:
determining a connection topology for the plurality of RFID antenna multiplexers; and
storing the connection topology in the RFID reader.

23. The RFID reader according of claim 22 wherein the operations further comprise retrieving at least one of a stored refresh time or a stored guard time for use in charging at least some of the plurality of external RFID multiplexers.

24. The RFID reader of claim 21 wherein the operations further comprise storing a value for a configuration variable to cause the RFID reader to automatically discover the at least one external RFID antenna multiplexer.

* * * * *